(12) United States Patent
Li et al.

(10) Patent No.: US 9,438,462 B2
(45) Date of Patent: Sep. 6, 2016

(54) SOFT BIT UN-UNIFORM QUANTIZATION METHOD, APPARATUS, COMPUTER PROGRAM AND STORAGE MEDIUM

(75) Inventors: Chao Li, Beijing (CN); Xie Li, Beijing (CN); Kun Yin, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/407,337

(22) PCT Filed: Jun. 28, 2012

(86) PCT No.: PCT/CN2012/077751
§ 371 (c)(1),
(2), (4) Date: Mar. 31, 2015

(87) PCT Pub. No.: WO2014/000225
PCT Pub. Date: Jan. 3, 2014

(65) Prior Publication Data
US 2015/0207658 A1 Jul. 23, 2015

(51) Int. Cl.
*H03D 1/24* (2006.01)
*H04L 27/38* (2006.01)
*H04L 25/06* (2006.01)
*H04L 1/00* (2006.01)

(52) U.S. Cl.
CPC ............ *H04L 27/38* (2013.01); *H04L 1/0052* (2013.01); *H04L 25/067* (2013.01); *H04L 1/0057* (2013.01)

(58) Field of Classification Search
None
See application file for complete search history.

(56) References Cited

U.S. PATENT DOCUMENTS

| | | | |
|---|---|---|---|
| 6,876,709 B1* | 4/2005 | Kim | H03M 13/6577 375/240.03 |
| 7,295,144 B1 | 11/2007 | Karthik et al. | |
| 8,050,362 B2 | 11/2011 | Gho et al. | |
| 2007/0258531 A1* | 11/2007 | Chen | H04L 25/067 375/261 |
| 2009/0022245 A1 | 1/2009 | Binkley | |

FOREIGN PATENT DOCUMENTS

| | | |
|---|---|---|
| CN | 101175057 A | 5/2008 |
| JP | 2004-165988 A | 6/2004 |
| WO | 2004/019576 A1 | 3/2004 |

OTHER PUBLICATIONS

International Search Report issued in corresponding International application No. PCT/CN2012/077751, date of mailing Apr. 11, 2013.

(Continued)

*Primary Examiner* — Chieh M Fan
*Assistant Examiner* — Wednel Cadeau
(74) *Attorney, Agent, or Firm* — Patent Portfolio Builders PLLC (57) ABSTRACT

The embodiments of the present disclosure disclose a soft bit un-uniform quantization method, apparatus, computer program and storage medium. The soft bit un-uniform quantization method comprises: determining a threshold value; obtaining a quantization step according to the threshold value; obtaining a first data after a QAM demodulating and before a Turbo decoding in a wireless communication system; and performing a soft bit un-uniform quantization on the first data to obtain a quantization result according to the threshold value and the step. According to the present disclosure, the data after the QAM demodulating and before the Turbo decoding may obtain a distinguished Euclidean distance value and thus the performance can be improved greatly.

7 Claims, 7 Drawing Sheets

(56) References Cited

OTHER PUBLICATIONS

Written Opinion of the International Searching Authority issued in corresponding International application No. PCT/CN2012/077751, date of completion of the opinion Mar. 27, 2013.
Martina, Maurizio et al., "State Metric Compression Techniques for Turbo Decoder Architectures," IEEE Transactions on Circuits and Systems I: Regular Papers; May 2011, vol. 58, No. 5, pp. 1119-1128.
Ghassemi, A. et al., "Turbo Decoding with Nonuniform Quantization," IEEE 60th Vehicular Technology Conference, 2004; VTC2004—Fall; vol. 3, pp. 2273-2277.
3GPP, "3rd Generation Partnership Project; Technical Specification Group Radio Access Network; Spreading and modulation (TDD), (Release 8)," 3GPP TS 25.223 V8.3.0 (Mar. 2009).

\* cited by examiner

SOFT BIT UN-UNIFORM QUANTIZATION METHOD, APPARATUS, COMPUTER PROGRAM AND STORAGE MEDIUM

TECHNICAL FIELD

This present disclosure relates to a communication field and particularly to a soft bit un-uniform quantization method, apparatus, computer program and storage medium.

BACKGROUND

In a current wireless communication system, for example in a 3G/4G wireless communication system, in order to achieve a high peak rate, the 3G/4G system usually adopts a typical configuration of a high order modulation before a Turbo decoding, such as a High Speed Packet Access+ (HSPA+) system.

In many communication systems, for example in a Time Division-Synchronous Code Division Multiple Access (TD-SCDMA) system, a Wideband CDMA (WCDMA) system and a Long Term Evolution (LTE) system, 64Quadrature Amplitude Modulation (QAM) high order modulation may be adopted. 64QAM may achieve a high transmission rate without the need to increase a bandwidth in the wireless system. However, the high order modulation may only be achieved in a high Signal to Noise Ratio (SNR) environment.

It should be noted that for the 64QAM, each modulation symbol has a corresponding transmission state. In the prior arts, for the 64QAM signals received by a receiver in the wireless communication system, there are three methods to calculate a constellation demodulation soft bit.

The first method adopts a Logarithm Likelihood Ratio (LLR) method to calculate each bit metric of a channel symbol:

$$\Lambda_k = \log \frac{\sum_{j=1:a_n=1}^{M} \exp\left\{-\frac{1}{2\sigma_n^2}\left[(r_k^{(i)} - x(j))^2 + (r_k^{(q)} - y(j))^2\right]\right\}}{\sum_{j=1:a_n=0}^{M} \exp\left\{-\frac{1}{2\sigma_n^2}\left[(r_k^{(i)} - x(j))^2 + (r_k^{(q)} - y(j))^2\right]\right\}}.$$

$x(j), y(i)$ are an I part and a Q part of a transmission signal respectively, $r^{(i)}_k$, $r^{(q)}_k$ are an I part and a Q part of a received signal respectively, $a_n$ is any one from six of $[a_1, a_2, a_3, a_4, a_5, a_6]$ and $m=2^6$.

The second method is to calculate the numerator and the denominator in the first method by using a maximum function. Therefore, the bit metric of bit position is calculated as follows:

$$\Lambda_k = \log \frac{\underset{j=1:a_n=1}{\overset{M}{\text{MAX}}}\left[\exp\left\{-\frac{1}{2\sigma_n^2}\left[(r_k^{(i)} - x(j))^2 + (r_k^{(q)} - y(j))^2\right]\right\}\right]}{\underset{j=1:a_n=0}{\overset{M}{\text{MAX}}}\left[\exp\left\{-\frac{1}{2\sigma_n^2}\left[(r_k^{(i)} - x(j))^2 + (r_k^{(q)} - y(j))^2\right]\right\}\right]}, \text{ and}$$

$$\Lambda_k = \underset{j=1:a_n=1}{\overset{M}{\text{MAX}}}\left[\left\{-\frac{1}{2\sigma_n^2}\left[(r_k^{(i)} - x(j))^2 + (r_k^{(q)} - y(j))^2\right]\right\}\right] - \underset{j=1:a_n=1}{\overset{M}{\text{MAX}}}\left[\left\{-\frac{1}{2\sigma_n^2}\left[(r_k^{(i)} - x(j))^2 + (r_k^{(q)} - y(j))^2\right]\right\}\right].$$

Figure 1:
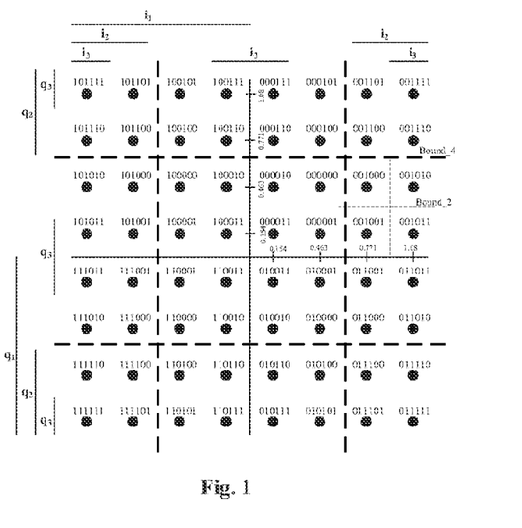
FIG. 1 is a schematic diagram showing a 64QAM constellation.

The third method is to use a distance between a value of a received signal and a constellation point as reliability information. FIG. 1 shows the 64QAM soft demodulation as follows:

$\Lambda_k(1) = r^{(q)}_k$ $\Lambda_k(2) = r^{(i)}_k$ $\Lambda_k(3) = 4/\sqrt{42} - |r^{(q)}_k|$ $\Lambda_k(4) = 4/\sqrt{42} - |r^{(i)}_k|$ $\Lambda_k(5) = 2/\sqrt{42} - |4/\sqrt{42} - |r^{(q)}_k||)$ $\Lambda_k(6) = 2/\sqrt{42} - |4/\sqrt{42} - |r^{(i)}_k||)$.

Obviously, the first method and the second method are very complex in terms of computation but the third method only requires a simple operation. According to a simulation result, the third method provides a similar performance compared with the other two methods, thus the third method is used in practical systems.

Figure 2:
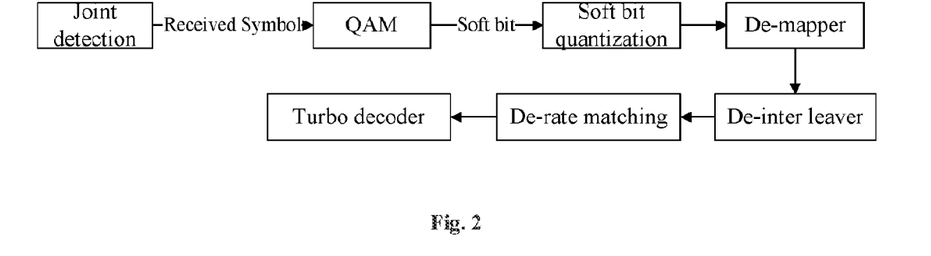
FIG. 2 is a schematic diagram showing a 64QAM and a Turbo decoding process.

As shown in FIG. 2, in a typical wireless receiver, for example in a wireless receiver in TD-SCDMA system, a typical 64QAM demodulation and Turbo decoding procedures are as follows.

The received signal is transformed to a baseband signal and then the baseband signal is sent to a data demodulation module to perform the 64QAM demodulation. The demodulated signal is quantized by a bit quantization module and decoded by a decoder (Turbo decoder) and the required original signal can be obtained as a result.

$\Lambda'_{demap} = [\Lambda_1(1), \Lambda_1(2), \Lambda_1(3), \Lambda_1(4), \Lambda_1(5), \Lambda_1(6), \Lambda_2(1) \ldots \Lambda_5(2) \ldots \Lambda_N(1) \ldots \Lambda_N(6)]$.

$\Lambda'_{demap}$ is a demodulated soft bit. Before being input into the Turbo decoder, the data are usually quantized by a 4-bit uniform quantization or by a 5-bit uniform quantization, shown in the following tables:

| Quantization Table of a 4-bit Uniform Quantization ||
| --- | --- |
| Input (x) | Output |
| x < −0.875 | −8 |
| −0.875 <= x < −0.75 | −7 |
| −0.75 <= x < −0.625 | −6 |
| −0.625 <= x < −0.5 | −5 |
| −0.5 <= x < −0.375 | −4 |
| −0.375 <= x < −0.25 | −3 |
| −0.25 <= x < −0.125 | −2 |
| −0.125 <= x < 0 | −1 |
| 0 <= x < 0.125 | 0 |
| 0.125 <= x < 0.25 | 1 |
| 0.25 <= x < 0.375 | 2 |
| 0.375 <= x < 0.5 | 3 |
| 0.5 <= x < 0.625 | 4 |
| 0.625 <= x < 0.75 | 5 |
| 0.75 <= x < 0.875 | 6 |
| 0.875 <= x | 7 |

| Quantization Table of a 5-bit Uniform Quantization ||
| --- | --- |
| Input (x) | Output |
| x < −0.9375 | −16 |
| −0.9375 <= x < −0.875 | −15 |
| −0.875 <= x < −0.8125 | −14 |
| −0.8125 <= x < −0.75 | −13 |
| −0.75 <= x < −0.6875 | −12 |

-continued

Quantization Table of a 5-bit Uniform Quantization

| Input (x) | Output |
| --- | --- |
| −0.6875 <= x < −0.625 | −11 |
| −0.625 <= x < −0.5625 | −10 |
| −0.5625 <= = x < −0.5 | −9 |
| −0.5 <= x < −0.4375 | −8 |
| −0.4375 <= x < −0.375 | −7 |
| −0.375 <= x < −0.3125 | −6 |
| −0.3125 <= x < −0.25 | −5 |
| −0.25 <= x < −0.1875 | −4 |
| −0.1875 <= x < −0.125 | −3 |
| −0.125 <= x < −0.0625 | −2 |
| −0.0625 <= x < 0 | −1 |
| 0 <= x < 0.0625 | 0 |
| 0.0625 <= x < 0.125 | 1 |
| 0.125 <= x < 0.1875 | 2 |
| 0.1875 <= x < 0.25 | 3 |
| 0.25 <= x < 0.3125 | 4 |
| 0.3125 <= x < 0.375 | 5 |
| 0.375 <= x < 0.4375 | 6 |
| 0.4375 <= x < 0.5 | 7 |
| 0.5 <= x < 0.5625 | 8 |
| 0.5625 <= x < 0.625 | 9 |
| 0.625 <= x < 0.6875 | 10 |
| 0.6875 <= x < 0.75 | 11 |
| 0.75 <= x < 0.8125 | 12 |
| 0.8125 <= x < 0.875 | 13 |
| 0.875 <= x < 0.9375 | 14 |
| 0.9375 <= x | 15 |

In the HSPA+ system, the 64QAM modulation is used. The performance deteriorates great with the 4-bit uniform quantization but deteriorates little with the 5-bit or more uniform quantization, having 2 to 3 dB performance improvement in high rate compared with the 4-bit uniform quantization. However, in practice, it is not convenient to realize the 5-bit quantization.

SUMMARY

The embodiments of the present disclosure disclose a soft bit un-uniform quantization method, apparatus, computer program and storage medium, by which the data after the QAM and before the Turbo decoding may obtain a distinguished Euclidean distance and thus the performance can be improved greatly.

According to an aspect of the present disclosure, a soft bit un-uniform quantization method is provided. The method comprises: determining a threshold value; obtaining a quantization step according to the threshold value; obtaining a first data after a QAM and before a Turbo decoding in a wireless communication system; and performing a soft bit un-uniform quantization on the first data to obtain a quantization result according to the threshold value and the step. In this embodiment, the data after the QAM (such as 64QAM) and before the Turbo decoding is quantized by setting the threshold value, and the data after the QAM and before the Turbo decoding may obtain a distinguished Euclidean distance value and thus the performance can be improved greatly.

In some embodiments, the method comprises: making the first data equal to the threshold value to get a second data if the first data is larger than the threshold value; and obtaining the quantization result according to the step and the second data.

In some embodiments, obtaining the quantization result according to the step and the second data comprises: obtaining a ratio between the second data and the step; and rounding down the ratio to obtain the quantization result.

In some embodiments, the $$\text{step} = \frac{\alpha}{2^3},$$

in which $\alpha$ is the threshold value and 4 represents a 4-bit quantization.

In some embodiments, the threshold value is within a range from 0 to 1.

In some embodiments, the threshold value is 0.5.

According to another aspect of the present disclosure, an apparatus for soft bit un-uniform quantization is also provided. The apparatus comprises: a determination module, which is configured to determine a first threshold value; a first obtaining module, which is configured to obtain a quantization step according the threshold value; a second obtaining module, which is configured to obtain a first data after a QAM (such as 64QAM) and before a Turbo decoding in a wireless communication system; and a quantization module, which is configured to perform a soft bit, un-uniform quantization on the first data to obtain a quantization result according to the threshold value and the step.

The present disclosure is not limited to the above features and advantages. Those skilled in the art may understand other features and advantages by reading the following detailed description and drawings.

DETAILED DESCRIPTION

Figure 3:
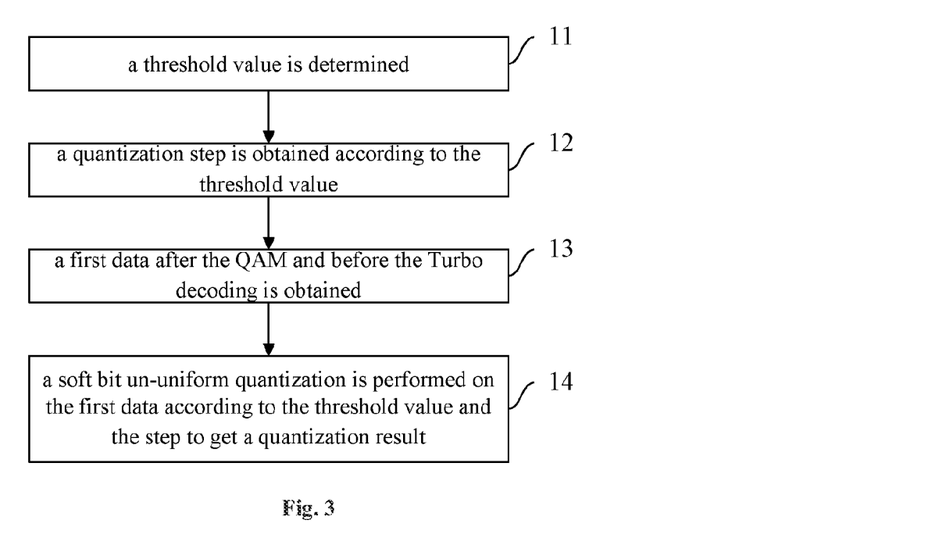
FIG. 3 is a flow chart showing a method for soft bit un-uniform quantization according to an embodiment of the present disclosure.

As shown in FIG. 3, a soft bit un-uniform quantization method according to an embodiment of the present disclosure comprises the following steps.

In step 11, a threshold value may be determined.

In step 12, a quantization step may be obtained according to the threshold value.

In step 13, a first data after the QAM (such as 64QAM) and before the Turbo decoding may be obtained in the wireless communication system.

In step 14, a soft bit un-uniform quantization may be performed on the first data to obtain a quantization result according to the threshold value and the step.

In this embodiment, the data after the QAM (such as 64QAM) and before the Turbo decoding is quantized by setting the threshold value, and the data after the QAM and before the Turbo decoding may obtain a distinguished Euclidean distance and thus the performance can be improved greatly.

Figure 4:
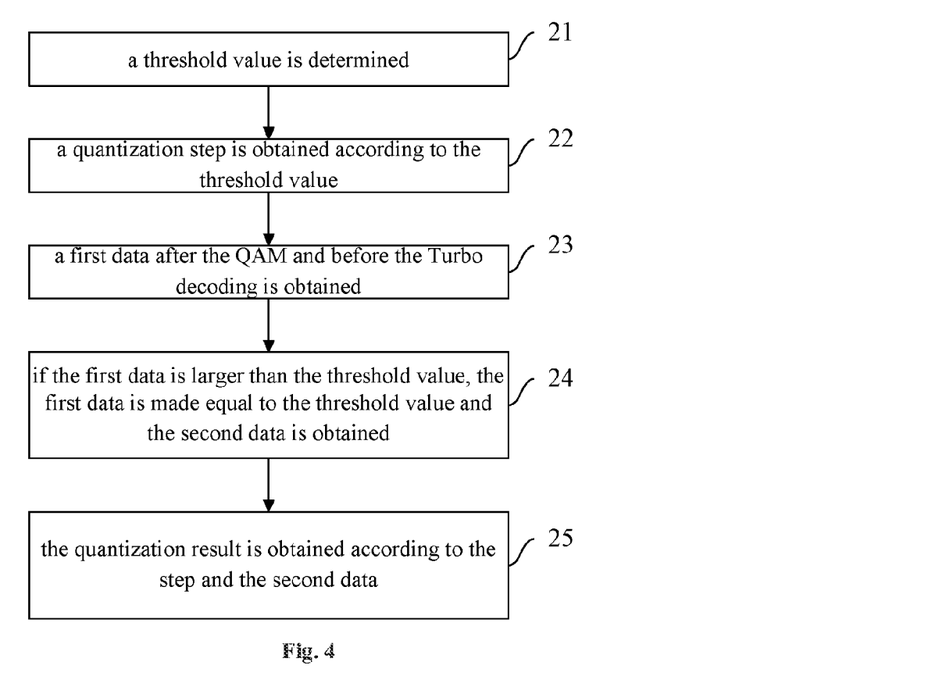
FIG. 4 is a flow chart showing a method for soft bit un-uniform quantization according to an embodiment of the present disclosure.

As shown in FIG. 4, a soft bit un-uniform quantization method according to another embodiment of the present disclosure comprises steps 21 to 25, in which steps 21 to 23 are the same with the steps 11 to 13 in the above embodiment, and description thereof is omitted.

In step 24, if the first data is larger than the threshold value, the first data may be made equal to the threshold value and the second data may be obtained.

In step 25, the quantization result may be obtained according to the step and the second data.

In this embodiment, the first data larger than the threshold value after the QAM and before the Turbo decoding is quantized to the threshold value to obtain the second data; a further quantization is performed according to the second data and the step to obtain the final quantization result; and the data after the QAM and before the Turbo decoding may obtain a distinguished Euclidean distance and thus the performance can be further improved.

Figure 5:
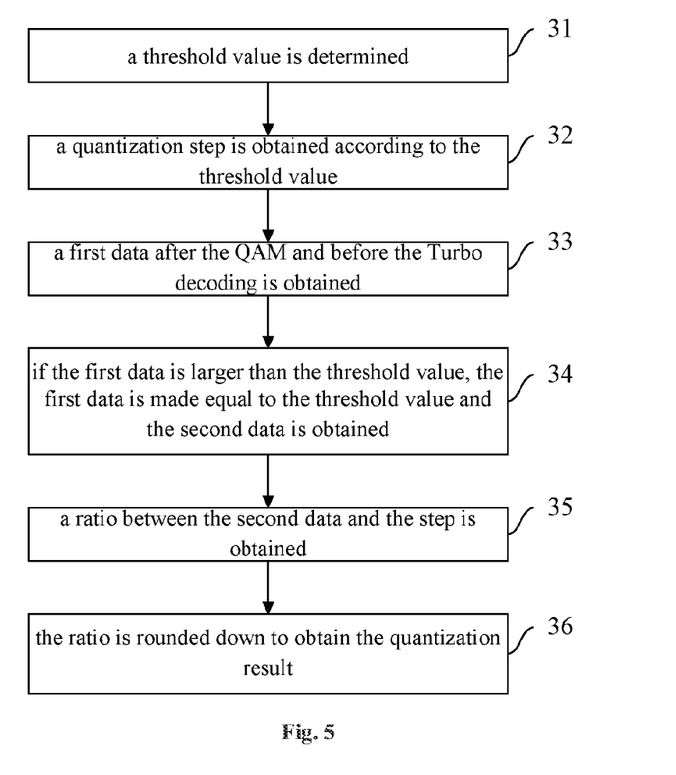
FIG. 5 is a flow chart showing a method for soft bit un-uniform quantization according to an embodiments of the present disclosure.

As shown in FIG. 5, a soft bit un-uniform quantization method according to another embodiment of the present disclosure comprises steps 31 to 36, in which steps 31 to 34 are the same with the steps 21 to 24 in the above embodiment, and description thereof is omitted.

In step 35, a ratio between the second data and the step may be obtained.

In step 36, the ratio may be rounded down to obtain the quantization result.

In this embodiment, the quantized second data is quantized again, i.e. the ratio is rounded down to obtain the quantization result; and the data after the QAM and before the Turbo decoding may obtain a distinguished Euclidean distance and thus the performance may be further improved.

In above embodiments, the $$\text{step} = \frac{\alpha}{2^3},$$

in which α is the threshold value and 4 represents a 4-bit quantization. According to the above embodiments, the first data after the 4-bit un-uniform quantization QAM and before the Turbo decoding may achieve the same performance as the 5-bit uniform quantization in the conventional systems with a reduced calculating complexity. Moreover, the first data after quantization may obtain a distinguished Euclidean distance and thus the performance can be improved greatly.

Figure 6:
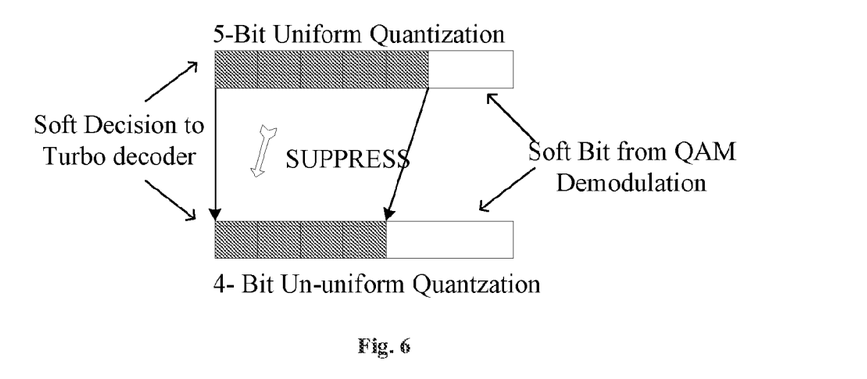
FIG. 6 is a schematic diagram showing how to suppress a 5-bit uniform quantization into a 4-bit un-uniform quantization.

As shown in FIG. 6, a 5-bit uniform quantization is suppressed into a 4-bit un-uniform quantization. A soft bit having a high energy represents a high confidence and therefore, each soft bit having the high energy almost has the same information and may be uniformly judged (cut) to be an extreme value of +1 or −1.

Figure 7:
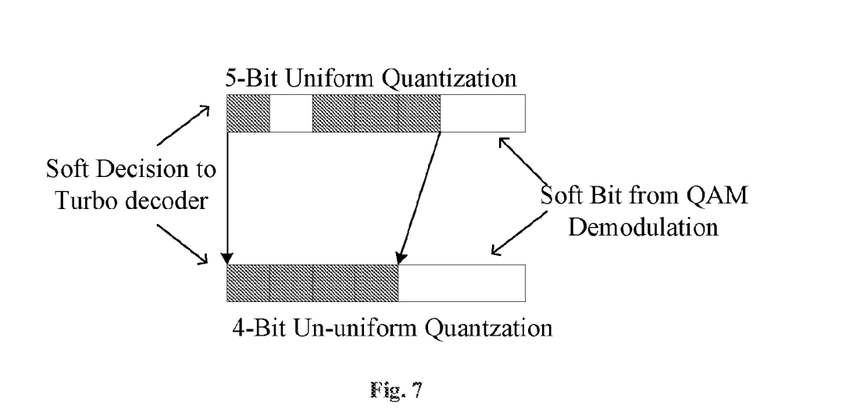
FIG. 7 is a schematic diagram showing that if a soft bit value is smaller than a threshold, how to shift the lowest 3 bits to left by 1 bit.

According to the soft bit un-uniform quantization method in the embodiments of the present disclosure, a parameter may be set as the threshold value by combining a hard decision and a soft decision. If the soft bit value is larger than this threshold value, do hard decision; if smaller, shift the lowest 3 bits to left by 1 bit, as shown in FIG. 7. Herein, "hard decision" means positive data is to 0 and negative data is to 1, for example, the data of 0 to 1 is set to 0, the data of −1 to 0 is set to 1, and each quantization result is represented by 1 bit. In the embodiments of the present disclosure, soft bit quantization refers to the soft decision and "soft decision" means each decision result is represented by multiple bits, such as the 4-bit un-uniform quantization in the embodiments.

The following table is the 4-bit un-uniform quantization.

| Input (x) | Output |
| --- | --- |
| x < −0.4375 | −8 |
| −0.4375 <= x < −0.375 | −7 |
| −0.375 <= x < −0.3125 | −6 |
| −0.3125 <= x < −0.25 | −5 |
| −0.25 <= x < −0.1875 | −4 |
| −0.1875 <= x < −0.125 | −3 |
| −0.125 <= x < −0.0625 | −2 |
| −0.0625 <= x < 0 | −1 |
| 0 <= x < 0.0625 | 0 |
| 0.0625 <= x < 0.125 | 1 |
| 0.125 <= x < 0.1875 | 2 |
| 0.1875 <= x < 0.25 | 3 |
| 0.25 <= x < 0.3125 | 4 |
| 0.3125 <= x < 0.375 | 5 |
| 0.375 <= x < 0.4375 | 6 |
| 0.4375 <= x | 7 |

In this embodiment, considers one threshold α. In theory, there is one confidence interval {0, α}. That is to say, to compress data to α for larger data than α. It will have the same decoding performance. α may be obtained from a simulation. The relationship between the threshold α and the performance in TD-SCDMA is shown in FIG. 7. α is a value of (0,1).

Figure 9:
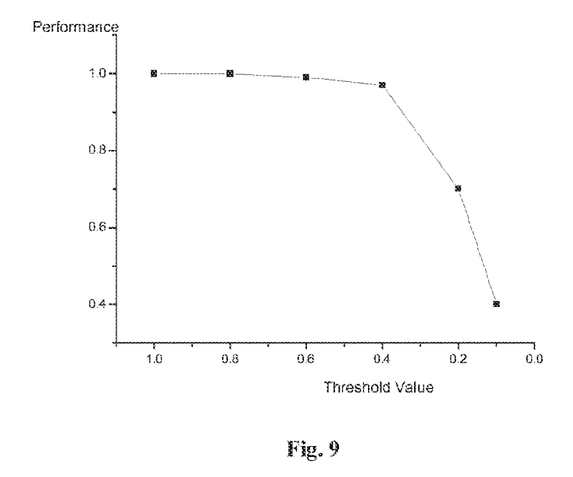
FIG. 9 is a diagram showing a relationship between a threshold and a performance.

From FIG. 9, it can be seen that the threshold α is about 0.5.

Figure 8:
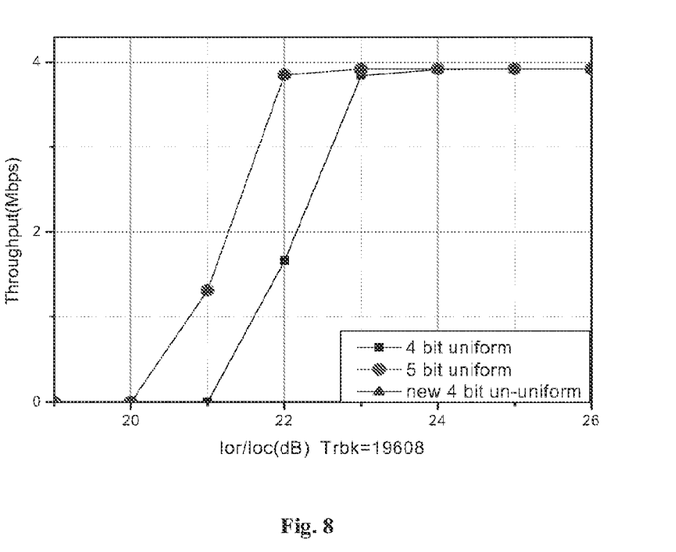
FIG. 8 is a diagram showing simulation results of TD-SCDMA HSDPA simulation methods.

From the simulation as shown in FIG. 8, by adding new threshold α, this new 4-bit un-uniform quantization method can reach the same performance level as the 5-bit uniform quantization. Apparently, the implementation for a Turbo decoder in hardware has no change. This disclosure can solve this problem only having software simply updated, having no hardware changed, having no interface changed, and having no apparent computation burden increased. According to embodiments of the present disclosure, the data rate may be improved greatly.

Figure 10:
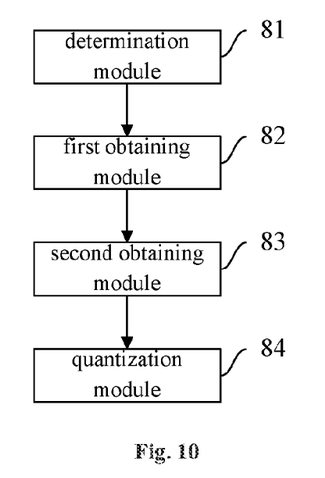
FIG. 10 is a block diagram showing a structure of an apparatus for soft bit un-uniform quantization according to an embodiment of the present disclosure.

FIG. 10 is a block diagram showing a structure of an apparatus for soft bit un-uniform quantization according to an embodiment of the present disclosure. As shown in FIG. 10, the apparatus for soft bit un-uniform quantization comprises: a determination module 81, which is configured to determine a first threshold value; a first obtaining module 82, which is configured to obtain a quantization step according to the threshold value; a second obtaining module 83, which is configured to obtain a first data after a QAM (such as 64QAM) and before a Turbo decoding in a wireless communication system; and a quantization module 84, which is configured to perform a soft bit un-uniform quantization on the first data to obtain a quantization result according to the threshold value and the step.

According to this embodiment, a same technical effect as the embodiment shown in FIG. 3 may be obtained and will not be illustrated in detail here.

Figure 11:
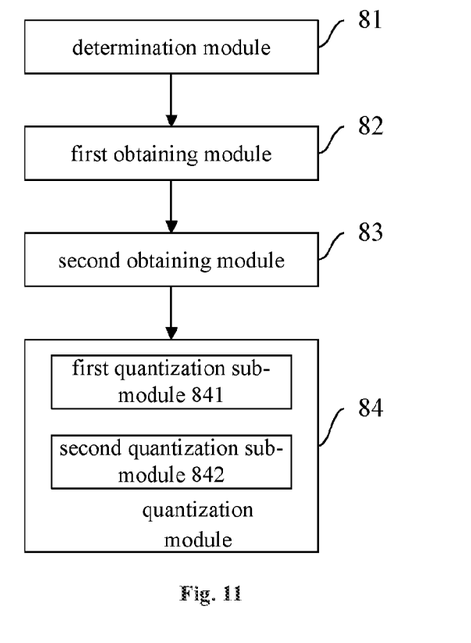
FIG. 11 is block diagram showing another structure of an apparatus for soft bit un-uniform quantization according to an embodiment of the present disclosure.

FIG. 11 shows another embodiment of the apparatus for soft bit un-uniform quantization. As shown in FIG. 11, the quantization module 84 comprises: a first quantization sub-module 841, which is configured to make the first data equal to the threshold value to obtain a second data if the first data is larger than the threshold value; and a second quantization sub-module 842, which is configured to obtain the quantization result according to the step and the second data.

Figure 12:
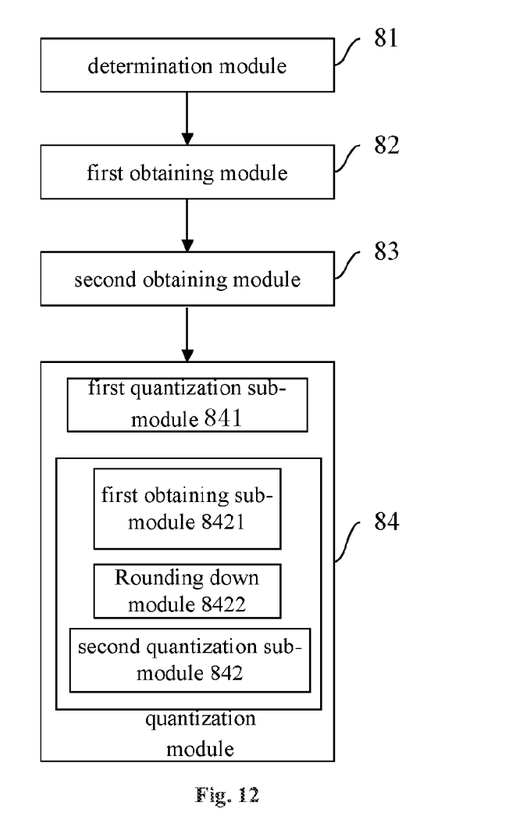
FIG. 12 is block diagram showing another structure of an apparatus for soft bit un-uniform quantization according to an embodiment of the present disclosure.

FIG. 12 shows another embodiment of the apparatus for soft bit un-uniform quantization. As shown in FIG. 12, the second quantization sub-module 842 comprises: a first obtaining sub-module 8421, which is configured to obtain a ratio between the second data and the step; and a rounding down module 8422, which is configured to round down the ratio to obtain the quantization result.

According to this embodiment, a same technical effect as the embodiment shown in FIG. 5 may be obtained and will not be illustrated in detail here.

In above embodiments, the $$\text{step} = \frac{\alpha}{2^3},$$

in which α is the threshold value and 4 represents a 4-bit quantization. According to the above embodiments, the first data after the 4-bit un-uniform quantization QAM and before the Turbo decoding may achieve the same performance as the 5-bit uniform quantization in the conventional systems, with a reduced calculating complexity. Moreover, the first data after quantization may obtain a distinguished Euclidean distance and thus the performance can be improved greatly.

Corresponding to the method for soft bit un-uniform quantization, the present disclosure further provides a computer program. The computer program includes a program code stored in a computer-readable storage medium, and can be loaded by a processor to implement the above-mentioned method.

The present disclosure further provides a storage medium storing the above-mentioned computer program.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A soft bit non-uniform quantization method, comprising:
   determining, based at least on a number of quantization bits, a threshold value defining an upper and lower bound for a quantization value range;
   determining a quantization step value using the threshold value, wherein the quantization step value is uniform within the quantization value range, and wherein the quantization $$\text{step value} = \frac{\alpha}{2^3},$$

in which α is the threshold value;
   obtaining a first data having a value after a Quadrature Amplitude Modulation, QAM, and before a Turbo decoding in a wireless communication system; and
   performing a soft bit non-uniform quantization on the first data to obtain a quantization result according to the threshold value and the quantization step value, wherein
      the value of the first data is set equal to the threshold value when the value of the first data is greater than or equal to a value that is a difference between the upper bound of the threshold value and the quantization step value,
      the value of the first data is set equal to a negative of the threshold value when the value of the first data is less than a value that is a difference between the lower bound of the threshold value and the quantization step value, and
      the value of the first data is quantized based on the uniform quantization step within the quantization value range.

2. The method according to claim 1, wherein the threshold value is greater than 0 and less than 1.

3. A non-transitory storage medium, storing a computer program, which when executed, perform the method according to claim 1.

4. The method according to claim 2, wherein the threshold value is 0.5.

5. An apparatus for soft bit non-uniform quantization, comprising:
   a determination module, which is configured to determine, based at least on a number of quantization bits, a threshold value defining an upper and lower bound for a quantization value range;
   a first obtaining module, which is configured to obtain a quantization step value, which is based on the threshold value, wherein the quantization step value is uniform within the quantization value range, and wherein the quantization $$\text{step value} = \frac{\alpha}{2^3},$$

in which α is the threshold value;
   a second obtaining module, which is configured to obtain a first data having a value after a QAM and before a Turbo decoding in a wireless communication system; and
   a quantization module, which is configured to perform a soft bit non-uniform quantization on the first data to obtain a quantization result according to the threshold value and the quantization step value, wherein
      the value of the first data is set equal to the threshold value when the value of the first data is greater than or equal to a value that is a difference between the upper bound of the threshold value and the quantization step value,
      the value of the first data is set equal to a negative of the threshold value when the value of the first data is less than a value that is a difference between the lower bound of the threshold value and the quantization step value, and the value of the first data is quantized based on the uniform quantization step within the quantization value range.

6. A soft-bit quantization method, comprising:

obtaining a first data having a value after a Quadrature Amplitude Modulation (QAM), and before a Turbo decoding in a wireless communication system; and performing a soft bit quantization using a quantization step value on the first data to obtain a quantization result by setting the value of the first data equal to an upper limit value when the value of the first data is greater than or equal to a value that is a difference between the upper limit value and the quantization step value, setting the value of the first data equal to a lower limit value when the value of the first data is less than a value that is a difference between the lower limit value and the quantization step value, and setting the value of the first data equal to a value between the upper and lower limit values using the quantization step value, wherein the soft bit quantization produces an X bit quantization value and the quantization step value is equal to a uniform quantization step value for an X+1 bit quantization value, and wherein the quantization $$\text{step value} = \frac{\alpha}{2^3},$$

in which $\alpha$ is the upper limit value.

7. The method according to claim 6, wherein X=4.

* * * * *